Feb. 3, 1942.  A. F. THORNTON  2,271,722
FERTILIZER DISTRIBUTOR
Filed July 6, 1940
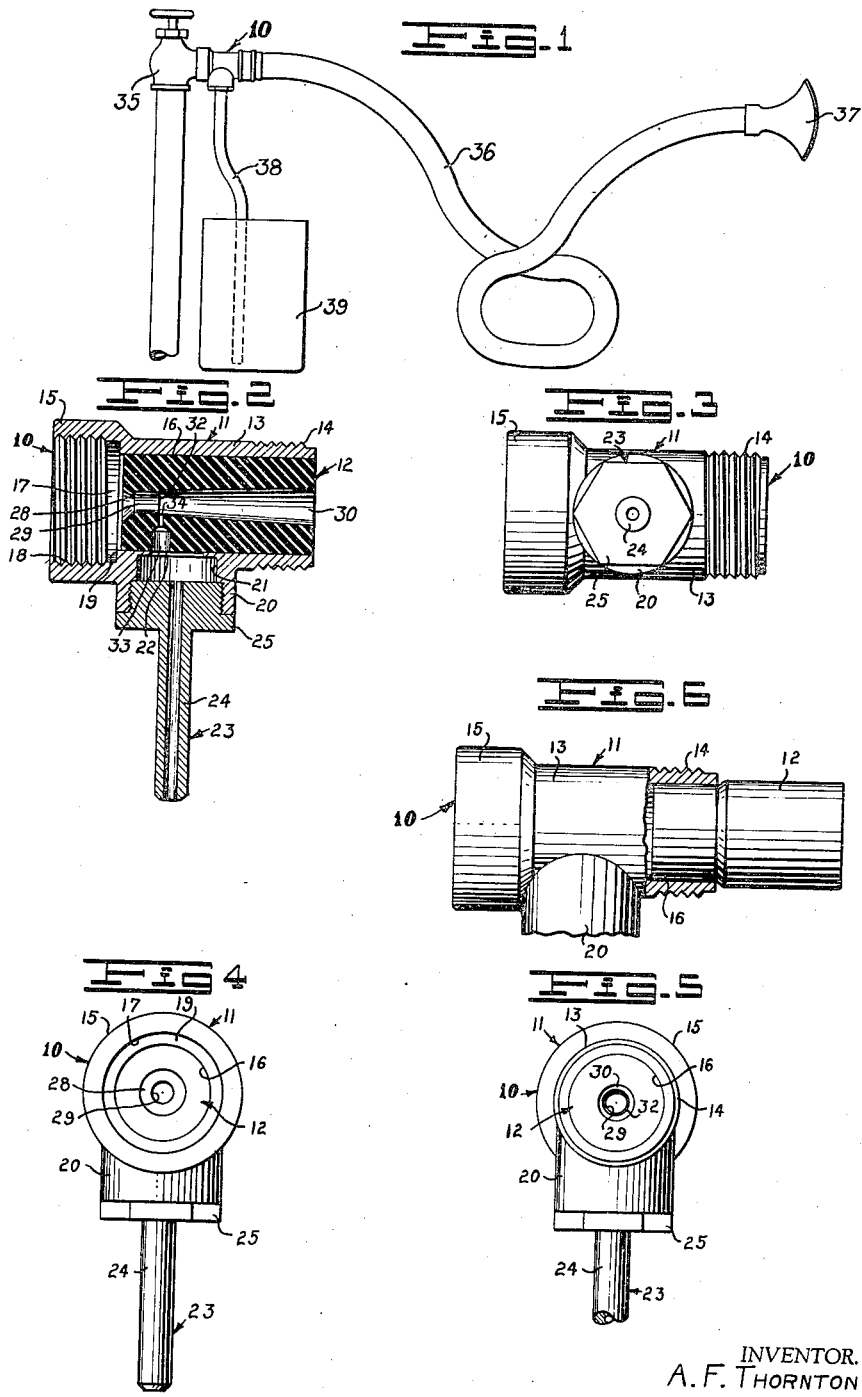
INVENTOR.
A. F. THORNTON
BY
ATTORNEY.

Patented Feb. 3, 1942

2,271,722

UNITED STATES PATENT OFFICE 2,271,722

FERTILIZER DISTRIBUTOR

Alexander F. Thornton, Pasadena, Calif.

Application July 6, 1940, Serial No. 344,291

3 Claims. (Cl. 103—262)

This invention relates to improvements in fertilizer distributor attachments.

The general object of the invention is to provide a fertilizer distributor attachment having a novel housing.

A more specific object of the invention is to provide a fertilizer distributor attachment including a novel housing having a novel core member frictionally engaged within the housing.

Another object of the invention is to provide a novel fertilizer distributor attachment including a metal housing having a resilient molded core member in which all of the necessary conduits are molded at the time of manufacture.

Other objects and the advantages of my invention will be apparent from the following description taken in connection with the accompanying drawing, wherein:

Fig. 1 is a side elevational view of a water hydrant with the fertilizer distributor attachment and associated parts arranged thereon;

Fig. 2 is a central sectional view of the fertilizer distributor attachment;

Fig. 3 is a bottom plan view of the fertilizer distributor attachment;

Fig. 4 is an elevational view of the fertilizer distributor attachment looking towards the right on Fig. 2;

Fig. 5 is an elevational view of the fertilizer distributor attachment looking towards the left on Fig. 2; and Fig. 6 is a fragmentary side elevational view with parts broken away showing the core being inserted.

Referring to the drawing by reference characters I have indicated my improved fertilizer distributor generally at 10. As shown the fertilizer distributor attachment includes a housing 11 made of a suitable metal or the like and a resilient cylindrical inner core member 12 which is preferably made of relatively hard rubber.

The fertilizer distributor attachment 10 is so constructed as to allow the housing 11 to be manufactured as a comparatively rough casting which only requires threading. The core member 12 which includes a rather complex conduit arrangement is preferably made as a molded rubber product with the conduits molded in place as it may be made of resilient material and machined.

The housing 11 includes a cylindrical portion 13 having an externally threaded portion 14 at one end and an axially aligned enlarged head portion 15 at the other end thereof. The portions 13 and 15 include centrally aligned bores 16 and 17. The bore 17 is provided with internal threads 18 and is somewhat larger than the bore 16 thus providing a shoulder 19 therebetween. The housing 11 further includes a laterally arranged cylindrical portion 20 located adjacent the portions 13 and 15 and which extends outwardly therefrom. The portion 20 is provided with an aperture 21 which communicates with the bore 16 through a reduced inlet aperture 22 in the housing.

The aperture 21 threadedly receives a connecting member 23 which includes a hollow stem portion 24 and an enlarged hexagonal headed portion 25.

The core member 12 includes a flared opening 28 at one end communicating with a centrally located aperture 29 which in turn communicates with one end of an elongated flared portion 30 opening out the end remote from the flared portion 28. At the junction of the flared portion 30 and the aperture 29 the portion 30 is slightly larger than the aperture thus providing a shoulder 32.

An aperture 33 in the core is aligned with, and communicating with, the flared portion 30 at the intersection of the portion 30 and the aperture 29 through a reduced inlet aperture 34.

The core member 12 is forced into the bore 16 preferably after it is finished (see Fig. 6) and is advanced until the core reaches the position shown in Fig. 2 wherein the aperture 33 communicates with the aperture 22 and in turn with the hollow stem portion 24.

In use the fertilizer distributor 10 is secured to a water hydrant 35 (see Fig. 1) by the threaded portion 18. The threaded portion 14 on the housing 11 in turn engages one end of a hose 36 provided with a suitable nozzle 37. A tube 38 has one end connected to the stem 24 and the other end communicating with a receptacle 39 which contains suitable liquid fertilizer.

The water from the hydrant passing over the shoulder 32 in the core member 12 produces a partial vacuum thus syphoning the fertilizer from the container 39 which in turn mixes with the water and is sprayed where desired through the nozzle 37.

From the foregoing it will be apparent that I have invented a novel fertilizer distributor which can be economically made and which is highly efficient for its intended purpose.

Having thus described my invention, I claim:

1. In a fertilizer distributor attachment including a housing and a core member, said housing including a cylindrical body portion having a hollow head portion thereon, threads in said hollow portion and on said cylindrical portion, a laterally extending cylindrical portion on said housing and having an internally threaded aperture and a smaller aperture communicating with the interior of said body, a connecting member threadedly secured in said threaded aperture, said core member including a central aperture communicating with one end thereof and having a flared portion communicating with the central aperture and opening out of the other end of the core member, said core member having an inlet aperture arranged at right angles to the axis of the core member and having a reduced inlet aperture communicating with said flared portion and said inlet aperture, said inlet apertures being aligned with said laterally extending cylindrical portion.

2. In a fertilizer distributor attachment including a housing and a core member, said housing including a cylindrical body portion having an enlarged head portion thereon, said cylindrical portion and said enlarged head portion having aligned bores, the bore in said enlarged portion being larger than the bore in said cylindrical portion, internal threads in said enlarged portion and external threads on said cylindrical portion remote from said enlarged portion, a laterally extending cylindrical portion on said housing adjacent said enlarged portion, said last mentioned cylindrical portion having an outer aperture and having a smaller aperture affording communication between said outer aperture and the interior of said body portion, a connecting member secured in said outer aperture, said connecting member having a hollow stem, said core member including a flared open inner end and having a central aperture communicating with the inner end of said flared end, said core member including a second portion reversely flared with respect to the first mentioned flared portion and communicating with and axially aligned with said central aperture and opening out of the end remote from said first mentioned flared end, a shoulder formed between said last mentioned flared portion and said central aperture, said core having an outer inlet aperture and having a reduced inner inlet aperture communicating with said second mentioned flared portion and said outer inlet aperture, said inlet apertures being aligned with said threaded aperture in the laterally extending cylindrical portion.

3. In a fertilizer distributor attachment including a housing and a core member, said housing including a cylindrical body portion having an enlarged head portion thereon, said cylindrical portion and said enlarged head portion having aligned bores, the bore in said enlarged portion being larger than the bore in said cylindrical portion, internal threads in said enlarged portion and external threads on said cylindrical portion remote from said enlarged portion, a laterally extending cylindrical portion on said housing adjacent said enlarged portion, said last mentioned cylindrical portion having an internally threaded cylindrical aperture and having a smaller aperture communicating therewith, said body having a reduced aperture affording communication between said smaller aperture and the interior of said body, a connecting member threadedly secured in said threaded aperture, said connecting member including a hollow stem member, said connecting member and said stem including a bore therethrough, said core member including a flared open inner end and having a central aperture communicating with the inner end of said flared end, said core member including a second portion reversely flared with respect to the first flared portion and communicating with and axially aligned with said central aperture and opening out of the end remote from said first mentioned flared end, a shoulder formed between said last mentioned flared portion and said central aperture, said core having an inlet aperture of less diameter than said reduced aperture and arranged at right angles to the axis of the core and having a reduced inlet aperture communicating adjacent said shoulder with said second mentioned flared portion and said inlet aperture, said core member being frictionally secured in said housing bore, said inlet apertures being in communication with but out of alignment with said head member bore.

ALEXANDER F. THORNTON.